455-4 AU 233 EX
XR 3,920,906

United States Patent [19] 1X 5192E

Gargini

[11] 3,920,906
[45] Nov. 18, 1975

[54] WIRED BROADCASTING SYSTEMS

[75] Inventor: Eric John Gargini, West Drayton, England

[73] Assignee: Communications Patents Limited, London, England

[22] Filed: July 2, 1974

[21] Appl. No.: 485,065

[30] Foreign Application Priority Data

July 5, 1973 United Kingdom ............... 32047/73

[52] U.S. Cl. ............................ 179/1 B; 317/148.5 B
[51] Int. Cl.² ..................... H01H 47/32; G09B 5/04
[58] Field of Search .................... 179/1 B, 15 R, 22; 317/141 S, 148.5 B

[56] References Cited

UNITED STATES PATENTS

| | | | |
|---|---|---|---|
| 1,337,676 | 4/1920 | Wilbur et al. | 179/15 BB |
| 1,632,012 | 6/1927 | Toomay | 179/1 B |
| 3,110,772 | 11/1963 | Hayward | 179/22 |
| 3,129,293 | 4/1964 | Warman | 179/22 |
| 3,381,146 | 4/1968 | Egan | 317/148.5 B |
| 3,614,322 | 10/1971 | Joslow | 179/1 B |

*Primary Examiner*—Kathleen H. Claffy
*Assistant Examiner*—E. S. Kemeny
*Attorney, Agent, or Firm*—Laurence R. Brown

[57] ABSTRACT

In a wired broadcasting system the switching means for selecting one of a plurality of program sources is a set of electromagnetic relay switches each having two operating coils connected into different switching circuits. Switching is accomplished from a train of pulses actuating thyrister circuits to operate selected sets of coils. In one embodiment three wires provide selection signals to three different relays having a common second winding circuit and energization of two coils on each relay is necessary to operate a selection switch set. By choice of sets of pulses by a dialing mechanism to energize two circuits having the different wiring patterns through the coils one of nine relays may be operated for a selection. The dial pulsing mechanism is operated twice to select one program defining one set of three relays and one of those three respectively.

10 Claims, 2 Drawing Figures

3920906
OR IN 179/1B

WIRED BROADCASTING SYSTEMS

This invention relates to wired broadcasting systems of the kind in which a plurality of programme sources and switch means for connecting individual subscriber's to a desired programme source are arranged at a common location - sometimes referred to as a programme exchange - and the subscriber's are connected to the programme exchange by way of individual signal cables.

It is an object of the present invention to provide in such a wired broadcasting system an improved switch means.

Accordingly the invention provides a wired broadcasting system comprising a plurality of programme signal sources, switch means for connecting a subscriber to a desired one of said programme signal sources and a signal cable extending between said switch means and said subscriber, said switch means comprising a plurality of electro-magnetically operable contacts, the electro-magnets comprising a plurality of coils, means for connecting said coils in groups such that each of the plurality of coils of an electro-magnet is connected in a separate group and means for controlling the flow of electric current through selected groups of coils thereby to actuate that contact associated with that electro-magnet the coils of which are included in the selected groups.

More specifically, the invention provides a wired broadcasting system comprising a plurality of programme signal sources, switch means for connecting a subscriber to a desired one of said programme signal sources and a signal cable extending between said switch means and said subscriber, said switch means comprising a plurality of electro-magnetically operable contacts, each electro-magnet comprising at least first and second coils, means serving to connect together the first coils of at least two electro-magnets to form one group, the second coils of which form part of a second and third group respectively and means for controlling the energisation of said coil groups thereby to actuate that switch means having its first and second coils in those groups the energisation of which are simultaneously controlled in like manner.

Preferably the coil groups are energised through the intermediary of semi-conductor devices. The semi-conductor devices comprise thyristors, the ability to pass current or otherwise of which is arranged to be controlled by the application thereto of a train of pulses.

Figure 1:
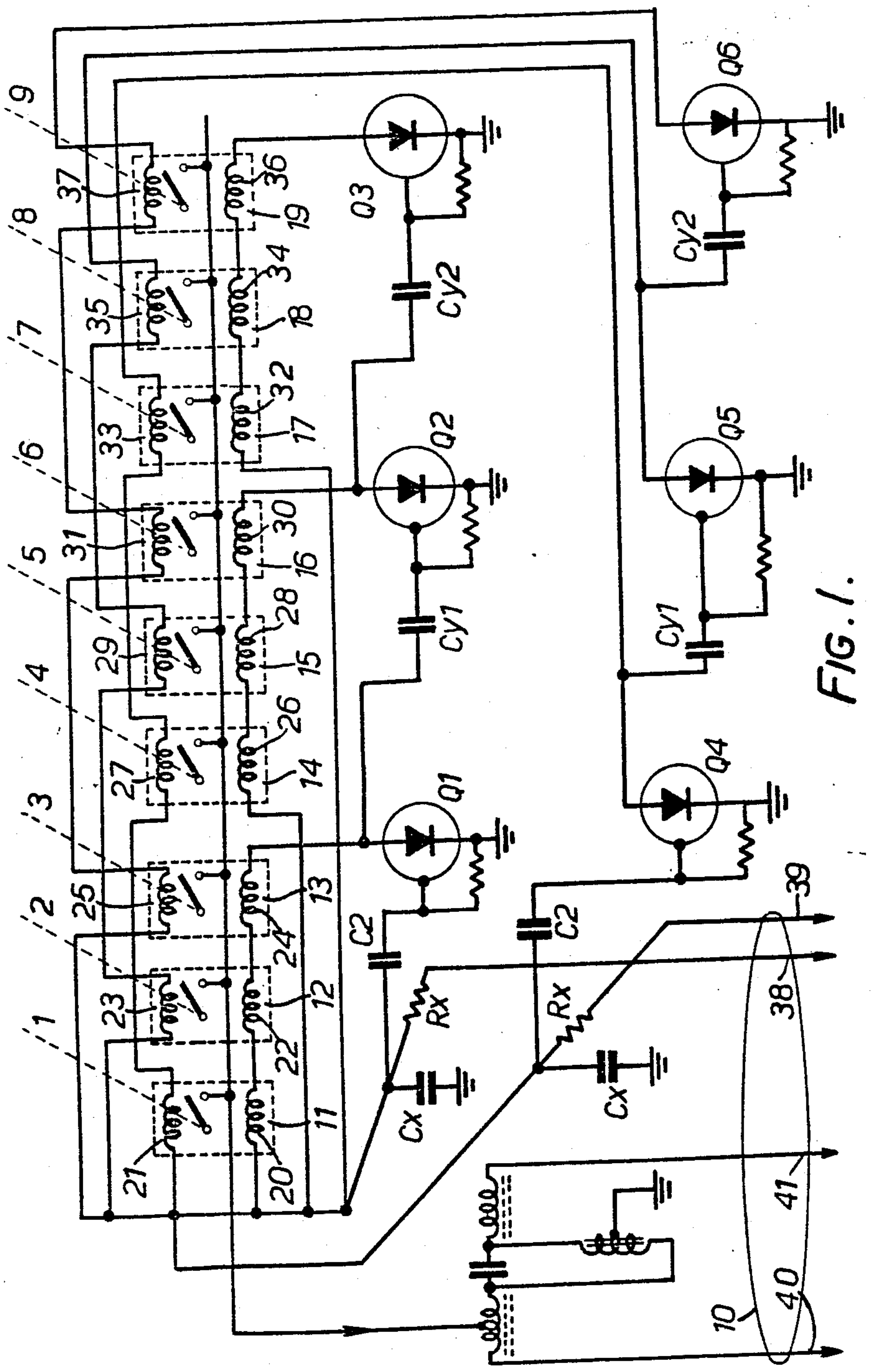
Figure 2:
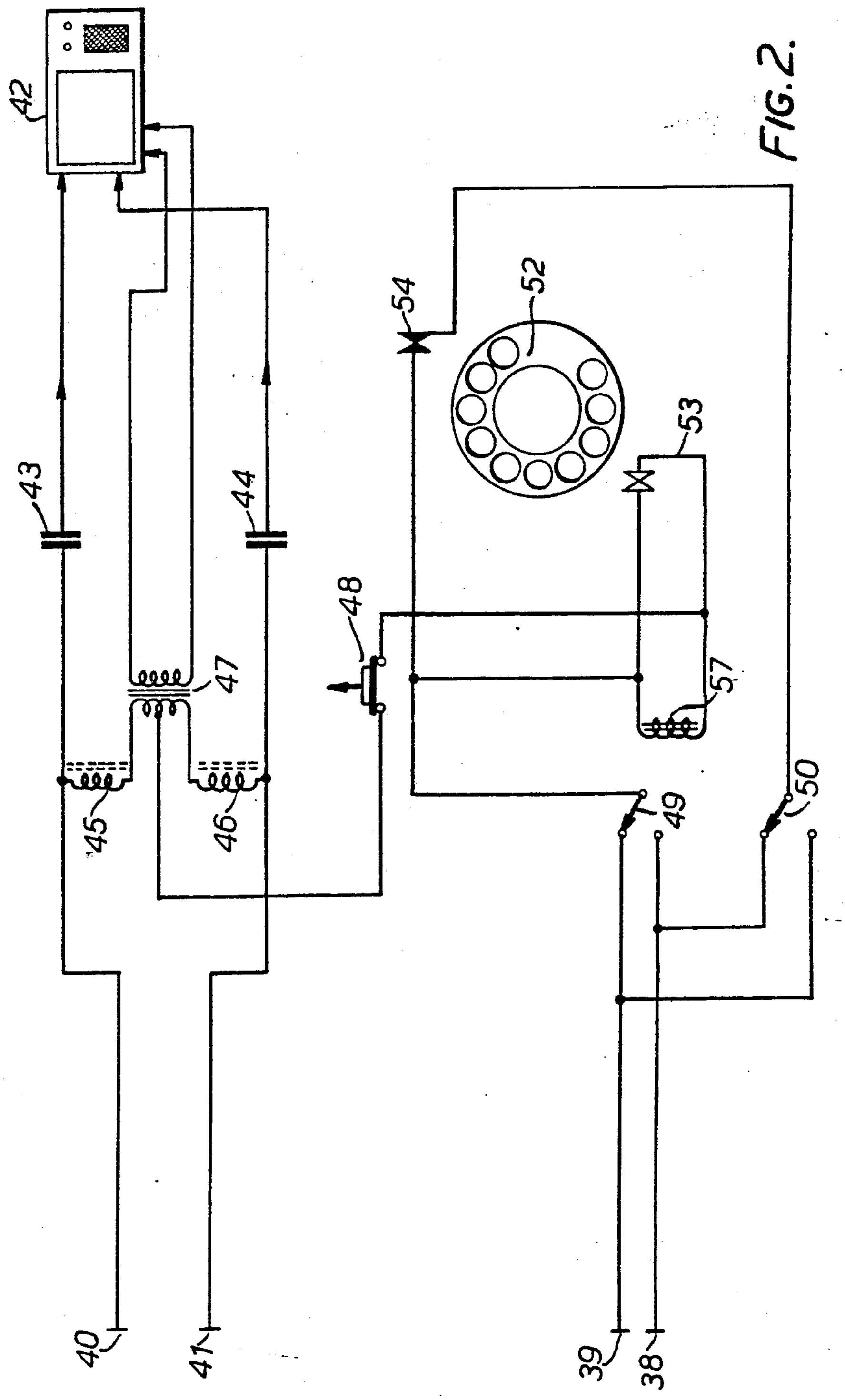

In order that the invention may be more readily understood one particular embodiment thereof will now be described, by way of example only, with reference to the accompanying drawings in which:

FIG. 1 is a schematic diagram of part of a wired broadcasting system in accordance with the present invention, and, FIG. 2 is a schematic diagram of part of a subscribers control equipment of a wired broadcasting system of the kind shown in FIG. 1.

FIG. 1 shows the switch arrangement in respect of one subscriber in a wired broadcasting system in accordance with the present invention and in which said subscriber may select any one of nine programmes. The nine programme signal sources comprise nine signal bus bars 1 – 9 on which the programme signals may be carried as high frequency modulated carrier waves in respect of the vision signal component and as audio frequency signals in respect of the accompanying sound component. If desired the accompanying sound signal component may be alternatively or additionally carried as another modulated high frequency carrier wave. The programme conductors of the subscriber's signal cable 10 may be connected to a desired programme signal bus bar by means of corresponding electro-magnetically operable contacts 11 – 19. The electro-magnets by means of which said contacts are operated each comprise two coils indicated respectively at 20 – 37. The coils of the electro-magnets are arranged in groups. Basically one coil of each of three adjacent electro-magnets are connected in series whilst the other coil of the first electro-magnet of each of the three groups are connected in series to form a group as are the other coils of the second and third electro-magnets in each group. Thus six groups of coils are formed, namely, the first group 20: 22: 24, the second group 26: 28: 30, the third group 32: 34: 36, the fourth group 21: 27: 33, the fifth group 23: 29: 35, and the sixth group 25: 31: 37.

It will be appreciated that if the electro-magnet effect of the coils is so arranged that energisation of one coil only is ineffecitve to actuate the corresponding contact only that contact associated with the electro-magnet of which both coils are energised will be actuated. The energisation of the various groups of coils are controlled by thyristors Q1, Q2, Q3, Q4, Q5 and Q6 respectively. The thyristors Q1, Q2 and Q3 are arranged to operate in sequence in response to pulses applied to them over the control line 38 in the subscriber's signal cable 10 whilst the thyristors Q4, Q5 and Q6 are similarly controlled in response to pulses applied to them over the control line 39 in the signal cable 10. The switching action of these thyristors will be described later. The remaining conductors 40 and 41 in the subscriber's signal cable 10 are utilised to convey the television programme signals from the programme exchange at which the switches are located to the subscriber's terminal equipment.

Turning now to FIG. 2, there is shown therein part of a subscriber's control equipment for use with the arrangement shown in FIG. 1. In this equipment programme signals arrive on the conductors 40 and 41. The vision signals are applied to a television receiver 42 through the capacitors 43, 44 whilst sound signals are applied separately after being derived from the conductors 40, 41 through the intermediary of high frequency chokes 45, 46 and the transformer 47. The primary winding of the transformer 47 is provided with a centre tap from which a conductor extends through a push to break reset switch 48. The signal conductors 40, 41 thus act as a phantom DC return for the control of the switching means. The control conductors 38, 39 are passed through a pair of change over contact sets 49, 50 of a slugged change over relay the coil 51 of which is connected between the switch 48 and movable blade of the contact set 49. The dial mechanism 52, similar to a standard telephone dial mechanism, has its off-normal contacts 53 connected in shunt with the coil 51 and its signalling contacts 54 connected between the movable blades of the contact sets 49, 50.

The operation of the system is as follows. Actuation of the reset switch 48 in the subscriber's equipment removes the supply potential to all the thyristors Q1 – Q6. This results in no current being passed by any thyristor and thus all electro-magnets will be de-energised. Upon release of the switch 48, the operating potential is reapplied to the thyristors slowly by virtue of the RC networks RX-CX in FIG. 1 to ensure that the thyrsitors remain cut off except for Q1 and Q4 which are actuated into their conductive state by virtue of the capacitors CZ coupling their gate electrodes to the control lines 38, 39. The first operation of the dial 52 causes a train of pulses to be applied to the supply lines of thyristors Q1, Q2, Q3 which causes the charge of capacitors CZ to be transferred successively to the capacitors CY1 and CY2. Depending upon the number of pulses generated by the contacts 54 one of the thyristors Q1, Q2 or Q3 remains conductive thus energising one set of associated electro-magnet coils. Upon completion of the first dialling operation the off-normal contacts 53 open and the coil 51 of the slugged change over relay is energised to actuate the spring sets 49 and 50 to transfer the dial contacts 54 tó the second control line 39. The second operation of the dial 52 causes the second set of thyristors Q4, Q5 and Q6 to operate in the same manner as the set Q1, Q2 and Q3. At the completion of the train of pulses one of the thyristors Q4, Q5, or Q6 remains conductive thus two sets of coils are energised and the electro-magnet of which both coils are included in these energised sets operates to establish a connection between the signal conductors 40 and 41 and the corresponding bus bar carrying the desired programme signal.

What we claim is:

1. A wired broadcasting system comprising a plurality of programme signal sources, switch means for connecting a subscriber to a desired one of said programme signal sources and a signal cable extending between said switch means and said subscriber, said switch means comprising a plurality of electro-magnetically operable contacts, the electro-magnets comprising a plurality of coils, means for connecting said coils in groups such that each of the plurality of coils of an electro-magnet is connected in a separate group and means for controlling the flow of electric current through selected groups of coils thereby to actuate that contact associated with that electro-magnet the coils of which are included in the selected groups wherein the means for controlling the flow of electric current comprises thyristor semi-conductor devices arranged to control passage of current by application thereto by a train of pulses, wherein the thyristors associated with one group of coils are arranged to operate in sequence in response to pulses applied to them over one control line in the subscriber's signal cable and the thyristors associated with the other group of coils are arranged to operate in sequence in response to pulses applied to them over a further control line in a subscriber's signal cable.

2. A system as claimed in claim 1, wherein the pulses are applied between said one or said further control line and a return conductor.

3. A system as claimed in claim 2, wherein the return conductor is formed by a phantom connection on a pair of signal conductors in the subscriber's signal cable.

4. A system as claimed in claim 3, wherein at the subscriber's terminal equipment means are provided for disconnecting the return conductor thereby to interrupt any current flow through the thyristors and thus de-energise all electro-magnets associated therewith.

5. A system as claimed in claim 4, wherein means are provided whereby upon connection of the return conductor to the subscriber's terminal equipment operating potential is arranged to be applied slowly to the thyristors.

6. A system as claimed in claim 5, wherein the operating potential is arranged to be applied to the thyristors through a resistor/capacitor network.

7. A system as claimed in claim 1, wherein each thyristor has a capacitor associated with the gate electrode thereof and the control pulses applied over the control lines cause a charge to be transferred successively from one capacitor to the next in oreder to control the current flow through said thyristors.

8. A system as claimed in claim 1, wherein the pulses are arranged to be generated by a telephone dial mechanism.

9. A system as claimed in claim 8, wherein said telephone dial mechanism is connected to one control line and wherein upon completion of an initial dialling operation the off-normal contacts of the telephone dial are arranged to cause connection of the other control line to said dial during a subsequent dialling operation.

10. A system as claimed in claim 9, wherein the connection to said one or other control line to the telephone dial is controlled by a slugged change-over relay the energisation of which is controlled by the off-normal contacts.

* * * * *